United States Patent Office 2,972,587
Patented Feb. 21, 1961

2,972,587

AQUEOUS FILLER-SEALER WOOD FINISHING COMPOSITION OF UREA-FORMALDEHYDE, SUGAR, BORIC ACID, ALUM AND SOLVENT

John M. Berry, Martinsville, Va., assignor to Midland Chemical Corporation, Dayton, Ohio, a corporation of Delaware No Drawing. Filed May 14, 1958, Ser. No. 735,117

4 Claims. (Cl. 260—17.3)

This application relates to a wood finishing system and composition and particularly to a wood finishing composition which in a single application fills and seals wood. Suitably the composition is provided such that it also stains the wood.

The composition of this invention is aqueous and sprayable and produces on wood a transparent, hard, water resistant coating having good sandable characteristics and which coating demonstrates remarkable adhesion to finish coats such as varnishes and lacquers, as well as providing excellent adhesion to the wood.

One of the objects of my invention is to provide a combination stain, penetrating filler and sealer for the single application finishing of wood and one whose characteristics are such that the main objectionable features of water soluble dyes are overcome.

Heretofore water soluble dyes have been restricted in their application, primarily because the water raised the grain of the wood to such an extent that a plurality of time consuming finishing operations were required in order to overcome the effect of the raised grain. The composition of this invention occasions no substantial grain-raising and accordingly the process is considerably more economical than the conventional systems while yet permitting the utilization of the desirable water soluble dyes, such as the aniline dyes.

A particular object of the invention is to provide a composition which fills and seals the pores of the wood and which is sprayable; the necessity for hand operations, such as hand application of the filler, brushing, padding and wiping of the filler, are eliminated.

I have found that a desirable improvement may be effected in the results attained with my composition, as described in my co-pending application referred to hereinbefore, by (a) eliminating starch, such as corn starch, from the composition; (b) replacing aluminum stearate with alum, preferably aluminum sulphate; and (c) utilizing Butyl Cellosolve (mono-butyl ether of ethylene glycol) with Butyl Carbitol (mono-butyl ether of diethylene glycol) to provide a more effective spreading agent where a spreading agent is required in the composition.

My single application filler-sealer composition comprises sucrose—preferably in the form of granulated sugar—and which serves as filler for the pores of the wood. The composition also includes boric acid and alum dissolved in water with the sugar; the boric acid acts to increase osmosis aiding wood penetration and also serves as a catalytic agent in the curing of resin employed in the composition and referred to more particularly hereinafter.

The alum functions to provide on the wood a surface which is readily sandable and which also affords improved adhesion to the finish coat. In this latter respect I have found the alum, such as aluminum sulphate, to be superior to the aluminum stearate.

The resin employed is preferably an aminoplast-aldehyde and I have found that urea-formaldehyde is particularly suitable. A urea formaldehyde powder in the "B" stage having the following characteristics has been employed with success:

A dry partially polymerized powder having a particle size of about 30 mesh; other characteristics of one such suitable resin include a Stormer viscosity of 20–70 r.p.m. at 21° C. (50 grams of water plus 100 grams of the resin); a gel time at 70° F. of 90–140 minutes (100 grams of the resin and 50 grams 4% ammonium chloride solution).

To aid spreadability of the composition, I preferably include a mixture of Butyl Carbitol and Butyl Cellosolve in the aqueous system.

To prepare the improved composition of invention I may dissolve the boric acid powder in water and then add the urea-formaldehyde resin while mixing and stirring to attain a good dispersion of the resin. With the urea formaldehyde resin referred to hereinbefore the dispersion is in milky white suspension form. To this suspension the sugar is added while stirring well; addition of the sugar appears to aid urea-formaldehyde dispersion. To the dispersion there is then added the aluminum sulphate followed by a mixture of Butyl Carbitol and Butyl Cellosolve.

When following the procedure thus outlined the temperature of the dispersion during the addition of the Butyl Carbitol should be controlled carefully in order that the temperature does not rise above about 80° F. Spoilage of the batch is apt to occur with excessive temperature rise probably due to the tendency of the hardenable "B" stage resin to set up prematurely.

To avoid the possibility of premature curing I prefer to combine some of the sugar, the boric acid and alum in one solution with some of the mixture of Butyl Carbitol and Butyl Cellosolve; the resin is then dispersed in water with the remainder of the sugar and the mixture of Butyl Carbitol and Butyl Cellosolve. Just before use I combine the resinous dispersion with the aqueous solution while mixing and stirring well. Under this condition the temperature consideration upon mixing is of substantially no importance, and no special precautions need be taken to maintain the temperature condition low.

The composition which results from either method of mixing is useful of itself when it is desired to preserve the wood in its natural color. However, should a stain be desired any water soluble dye, such as the aniline dyes, may be added to the composition. To prepare such a composition I may simply add the dye to the aqueous composition in suitable proportion for the purpose, or I may prepare a separate formulation containing the dye, sucrose, boric acid, Butyl Carbitol and water, which formulation is then added to the base composition.

The composition whether containing a dye or otherwise need only have a viscosity such that the wood may be adequately dipped therein or sprayed therewith. Preferably the wood is sprayed with the composition. In general useful dip compositions have a viscosity such that they may be sprayed, while compositions specifically designed for spraying usually are higher in viscosity.

The composition should exhibit an acidic character, the preferred pH lying in the range of about 4.5 and 6.0.

As illustrative of the practice of the invention the following procedure is representative: mix and stir well to effect solution fifteen (15) ounces of boric acid in five (5) gallons of water; add to this while stirring thirty (30) pounds of urea-formaldehyde resin in dry partially polymerized ("B" stage) powder form—such as is already specifically referred to hereinbefore; upon addition of the resin the dispersion takes the form of a milky white suspension—to effect dispersion agitation should take place for approximately ten (10) minutes. About thirty (30) pounds of sucrose (granulated cane or beet sugar) is then added to the dispersion while mixing—the dispersion of the resin is assisted by the addition of the sugar as well as by the hydration action occurring with respect to the resin; further the sugar aids the transparency of the resultant film as well as functioning as a filler for the pores of the wood.

To the sugar-containing dispersion there is added approximately one (1) pound of aluminum sulphate while mixing: Butyl Carbitol is then added slowly in the amount of thirty-two (32) ounces while agitating; then thirty-two (32) ounces of Butyl Cellosolve are mixed in slowly and while stirring; thereafter sufficient water is added to make ten (10) gallons. Agitation of the whole should be continued for fifteen (15) minutes to one-half hour to insure of the thoroughness of the dispersion.

The above composition may be sprayed on a smooth sanded wood surface directly—if the wood is to be finished without dye—or a water soluble dye may be dispersed thereon; the sprayed wood is air dried or first air dried for a short period and then force dried at temperatures below about 130° F. The air drying serves to eliminate blister formation by providing a relatively slow initial evaporation.

As further illustrative of the invention prepare a solution by mixing together:

| | |
|---|---|
| Sugar | pounds 10 |
| Boric acid (powdered) | do 1 |
| Alum (powdered) | do 1 |
| Mono-butyl ether of diethylene glycol (Butyl Carbitol) | gallon ½ |
| Mono-butyl ether of ethylene glycol (Butyl Cellosolve) | quart 1 |

Water sufficient to make 5 gallons.

Prepare a dispersion by mixing together:

| | |
|---|---|
| Sugar | pounds 10 |
| Urea-formaldehyde ("B" stage) | do 15 |
| Water | do 19.8 |
| Mono-butyl ether of ethylene glycol (Butyl Cellosolve) | ounces 20 |
| Mono-butyl ether of diethylene glycol (Butyl Carbitol) | gallon ½ |

Then pour the solution into the dispersion to form the composition and spray the composition on the wood.

The resultant composition contains approximately:

| | Pounds |
|---|---|
| Sugar | 20 |
| Urea-formaldehyde ("B" stage) | 15 |
| Boric acid | 1 |
| Aluminum sulphate | 1 |
| Mono-butyl ether of diethylene glycol (Butyl Carbitol) | 4 |
| Mono-butyl ether of ethylene glycol (Butyl Cellosolve) | 1.9 |
| Water | 27.6 |

As an example of a stain composition, add to the immediate foregoing composition:

| | |
|---|---|
| Calcocid Scarlet—MoO conc. | ounces 5 |
| Yellow Powder #700 | do 1 |
| Buffalo Black nBR, 126% | gallon ½ |

This quantity of material may be employed per gallon of the above composition.

The composition containing the stain is applied and dried as set out hereinbefore.

The given formulae are representative and it would be apparent to those skilled in the art that various changes may be made without departing from the scope of my invention. For example, the quantity of sugar may be varied but should be sufficient to provide adequate filling, while yet maintaining a suitable viscosity for spraying or dipping. Also drying time is controllable by changing the Butyl Carbitol content, for example.

The product of the application of the composition is a hard, insoluble, transparent film through which the grain of the wood is emphasized; such film formation is a particularly important feature since its quality is such it covers well, is continuous, does not shrink to any substantial degree and presents when hardened a readily sandable surface.

When the film is dried and hardened it is simply sanded smooth and lacquer or varnish is applied, usually two or three coats in the customary manner.

It will be understood that this invention is susceptible to modification in order to adapt it to different usages and conditions and accordingly, it is desired to comprehend such modifications within this invention as may fall within the scope of the appended claims.

What is claimed is:

1. A wood finishing composition which is an aqueous penetrating filler and sealer dispersion for the single application finishing of wood, which has the characteristic of not substantially raising the grain of wood to which it is applied and which dries to a hard, substantially insoluble, transparent, sandable film, such composition comprising: water, sucrose, boric acid and alum dissolved in the water, and urea-formaldehyde resin dispersed in the water, said aqueous composition being acidic and the urea-formaldehyde resin and sucrose constituting major constituents.

2. A wood finishing composition which is an aqueous penetrating filler and sealer dispersion for the single application finishing of wood, which has the characteristic of not substantially raising the grain of wood to which it is applied and which dries to a hard, substantially insoluble, transparent, sandable film, said composition comprising: water, sucrose, boric acid and alum dissolved in the water, urea-formaldehyde resin dispersed in the water, and a mixture of mono-butyl ether of diethylene glycol and mono-butyl ether of ethylene glycol in the water, said aqueous composition having acidic conditions and the urea-formaldehyde resin and sucrose constituting major constituents.

3. A wood finishing composition which is an aqueous penetrating filler and sealer dispersion for the single application finishing of wood, which has the characteristic of not substantially raising the grain of wood to which it is applied and which dries to a hard, substantially insoluble, transparent, sandable film, said composition comprising:

| | |
|---|---|
| Boric acid | ounces 15 |
| Urea-formaldehyde ("B" stage powder form) | pounds 30 |
| Sucrose | do 30 |
| Aluminum sulphate | do 1 |
| Mono-butyl ether of diethylene glycol | do 2 |
| Mono-butyl ether of ethylene glycol | do 2 |

Water sufficient to make 10 gallons.

4. A wood finishing composition which is an aqueous penetrating filler and sealer dispersion for the single application finishing of wood, which has the characteristic of not substantially raising the grain of wood to which it is applied and which dries to a hard, substantially insoluble, transparent, sandable film, said composition comprising:

| | Pounds |
|---|---|
| Sugar | 20 |
| Urea-formaldehyde ("B" stage powder form) | 15 |
| Boric acid | 1 |
| Aluminum sulphate | 1 |
| Mono-butyl ether of diethylene glycol | 4 |
| Mono-butyl ether of ethylene glycol | 1.9 |
| Water | 27.6 |

No references cited.